United States Patent [19]

Lane

[11] 4,116,650

[45] Sep. 26, 1978

[54] DEVICE FOR PREVENTING CIRCULATION OF LIQUID WATER ENTRAINED IN COMPRESSED AIR

[76] Inventor: Arlo E. Lane, 2416 Wildwood Rd., Reading, Mich. 49274

[21] Appl. No.: 782,978

[22] Filed: Mar. 30, 1977

[51] Int. Cl.² ............................................. B01D 53/04
[52] U.S. Cl. ......................................... 55/387; 55/32; 55/DIG. 17
[58] Field of Search ................. 55/29, 32, 33, 35, 387, 55/500, 501, 520, 528, DIG. 17; 210/484, 488, 497 R

[56] References Cited

U.S. PATENT DOCUMENTS

| | | | |
|---|---|---|---|
| 2,083,546 | 6/1937 | Aldham | 210/484 |
| 2,159,121 | 5/1939 | Alley | 55/520 X |
| 2,660,166 | 11/1953 | Coleman | 55/35 X |
| 2,669,995 | 2/1954 | Troy | 55/520 X |
| 3,131,040 | 4/1964 | Dunn et al. | 55/33 X |

OTHER PUBLICATIONS

Deltech Air Dryer, Deltech Eng. Inc., Form 300, 2/19/69.

*Primary Examiner*—Charles N. Hart
*Assistant Examiner*—Robert H. Spitzer
*Attorney, Agent, or Firm*—James W. Pearce; Roy F. Schaeperklaus

[57] ABSTRACT

A device for eliminating droplets of water from a stream of compressed air in which compressed air is passed through a plug of porous water absorbent material which absorbs the droplets. Continued passage of the stream of compressed air through the plug evaporates the water from the plug. The plug is held in a tubular container in series with a compressed air line. The container can be transparent. The plug can be formed of a strip of cotton gauze spirally wound with a strip of wire screening.

5 Claims, 8 Drawing Figures

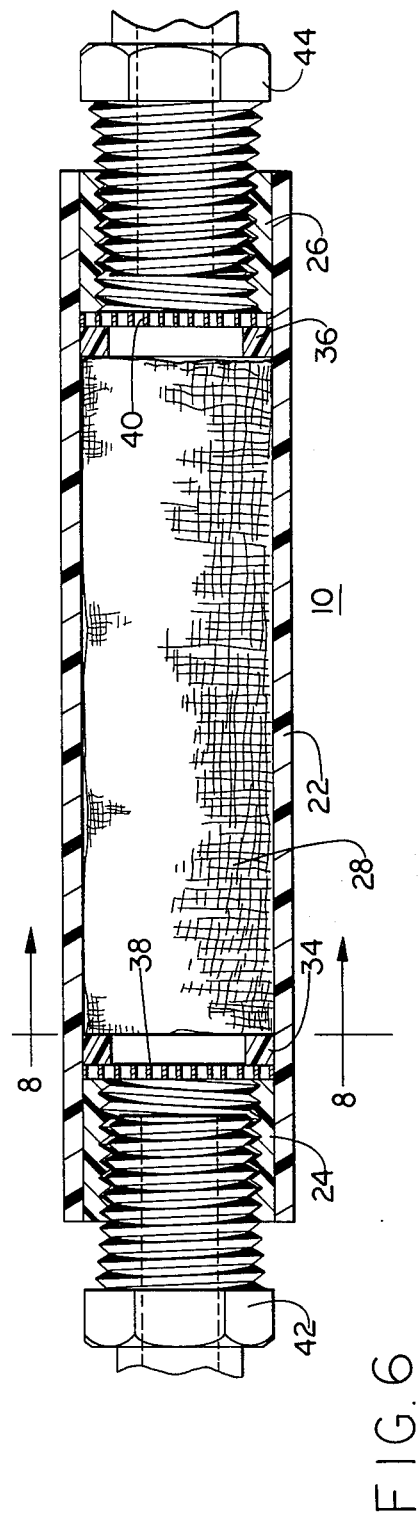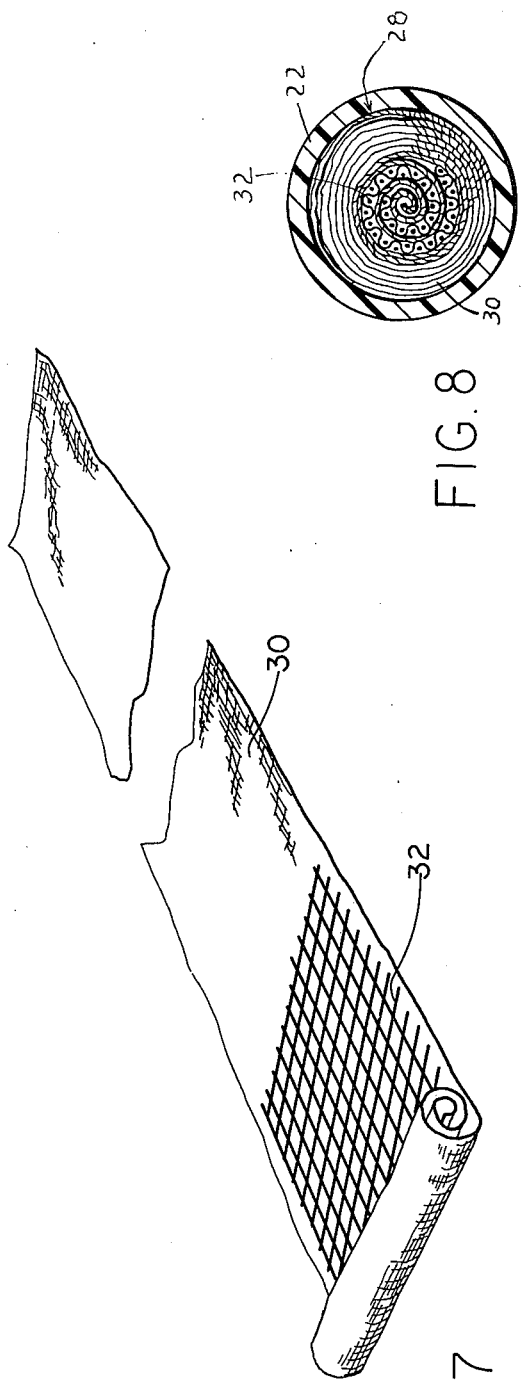

DEVICE FOR PREVENTING CIRCULATION OF LIQUID WATER ENTRAINED IN COMPRESSED AIR

This invention relates to pneumatic equipment. More particularly, this invention relates to a device for preventing circulation of liquid water entrained in compressed air.

It is not unusual for small droplets of water to become entrained in compressed air. If the compressed air is used in paint spraying, such droplets of water can cause imperfections in a paint job. If the compressed air is used to operate pneumatic tools or the like, the entrained water can cause damage to parts of the pneumatically operated tools.

An object of this invention is to provide a device for a compressed air line which eliminates entrained water.

A further object of this invention is to provide such a device which includes a porous plug of fibrous absorbent material through which the compressed air passes and which absorbs the entrained droplets of water.

A further object of this invention is to provide such a device in which the water is evaporated from the plug as air passes through the plug after droplets of entrained water have been absorbed.

A further object of this invention is to provide such a plug which is dimensionally stable.

A further object of this invention is to provide a device for removing entrained water from a compressed air line in which the compressed air is passed through a porous plug of fibrous absorbent material so that the entrained water is absorbed thereby and in which the absorbed water is evaporated from the plug as further compressed air passes through the plug.

Briefly, this invention provides a tubular container in a compressed air line through which compressed air passes. A porous plug of fibrous absorbent material is mounted in the tubular container so that the compressed air passes through the plug. The plug can be formed of a sheet of cotton gauze or the like rolled with a sheet of screen material which keeps the plug dimensionally stable to form a cylindrical plug which fits tightly inside the tubular container. Transverse perforated plate member can be mounted in the container at opposite ends of the plug to hold the plug in position in the container. The compressed air passes through the plug so that any entrained droplets of water in the air are absorbed by the gauze of the plug. As more air passes through the plug, absorbed moisture is vaporized into the air to remove the moisture from the plug. The container can be formed of transparent material so that the plug can be observed and the plug can be monitored to prevent excessive build-up of moisture therein.

The above and other objects and features of the invention will be apparent to those skilled in the art to which this invention pertains from the following detailed description and the drawings, in which:

FIG. 6 is a view in section taken on an enlarged scale on the line 6—6 in FIG. 2;

FIG. 7 is a perspective view of an assembly of a gauze strip and a screen element prior to forming into a plug of the device; and FIG. 8 is a view in section taken on the line 8—8 in FIG. 6.

In the following detailed description and the drawings, like reference characters indicate like parts.

Figure 1:
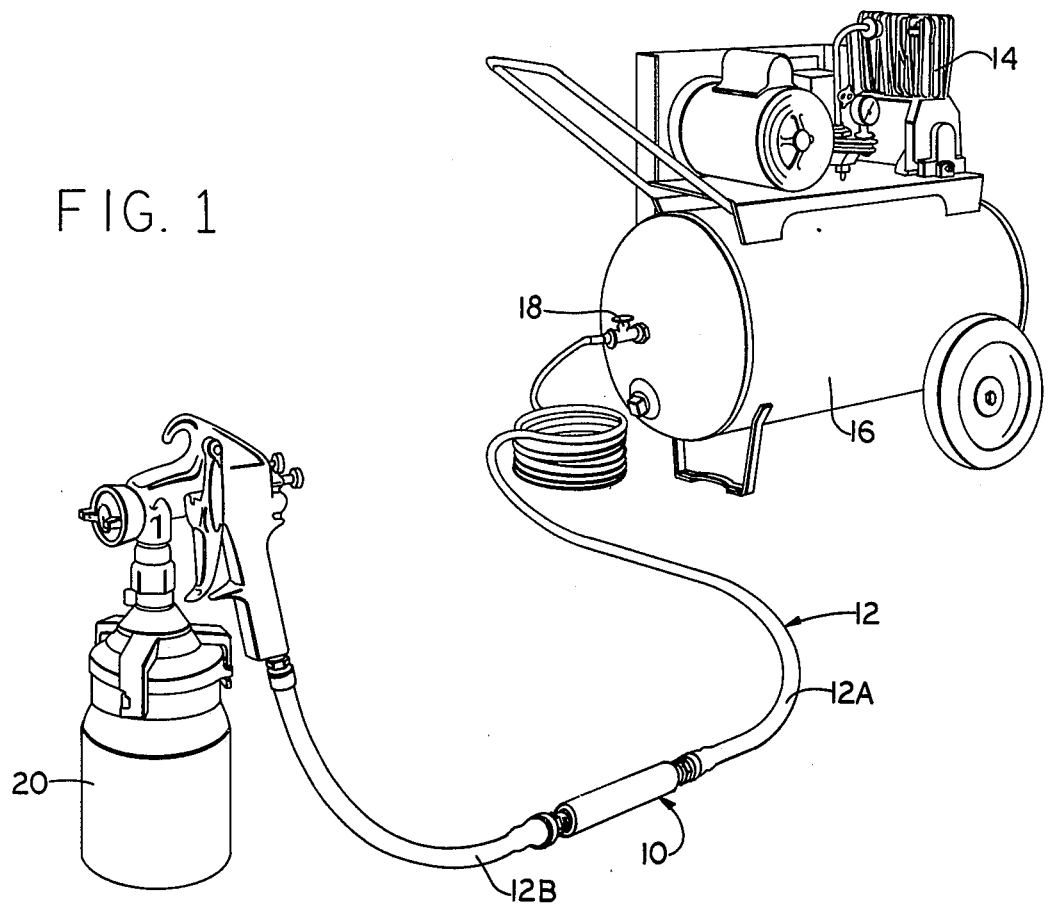
FIG. 1 is a perspective view of a compressed air painting system which includes a device for removing entrained water which is constructed in accordance with an embodiment of this invention.

In FIG. 1 is shown a pneumatically powered paint spraying system which includes a device 10 for removing entrained water which is constructed in accordance with an embodiment of this invention. The device 10 is mounted in a pneumatic line 12 between sections 12A and 12B thereof so that the device is in series between the sections of the pneumatic line. Air is compressed by a compressor 14 and air under pressure is stored in a tank 16. A value 18 supplies air under pressure from the tank 16 to the pneumatic line 12. The line 12 supplies the air to a paint spray gun 20 after the air has passed through the device 10.

Figure 2:
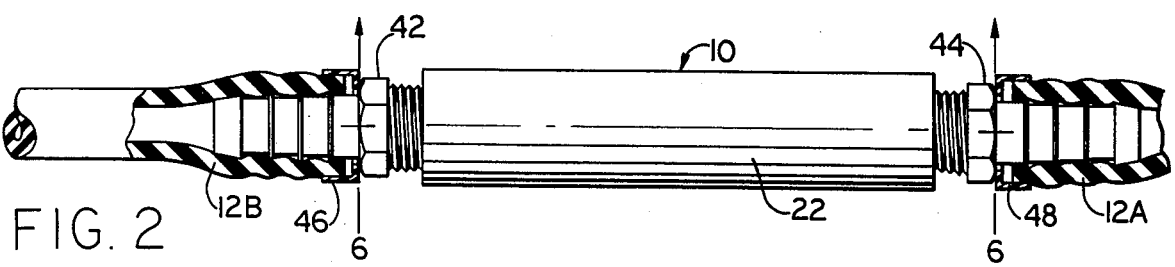
FIG. 2 is a view in side elevation of the device for removing entrained water which is shown in FIG. 1, fragmentary portions of hose sections being shown in association therewith.
Figure 3:
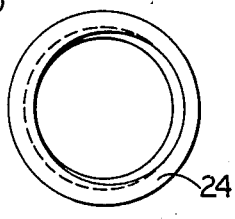
FIG. 3 is a view in end elevation of a threaded insert of the device.
Figure 4:
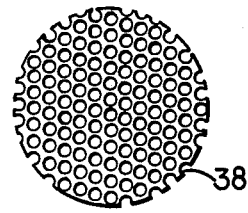
FIG. 4 is a view in end elevation of a perforated plate member of the device.
Figure 5:
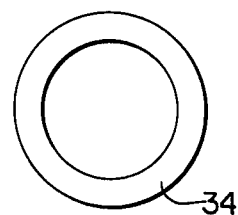
FIG. 5 is a view in end elevation of a retaining ring of the device.

Details of construction of the device 10 are shown in FIGS. 2 and 6. The device 10 includes a tubular body 22, which can be formed of transparent plastic material. A porous plug 28 is mounted in the central portion of the tubular body 22. The plug 28 is formed from a strip 30 (FIG. 7) of cotton gauze fabric which is rolled into a cylinder to form the plug 28. A length of screening 32, which can be aluminum window screening or the like, is laid on the end portion of the gauze strip about which the rest of the gauze strip is rolled so that the plug, as shown in FIG. 8, is formed of gauze spirally wound with substantially rigid wire screening spirally wound between inner convolutions of the gauze. The plug 28 is held in place inside the tubular body 22 between retaining rings 34 and 36 (FIG. 6) which are bonded or mechanically attached, as by press fitting, to the inner wall of the tubular body 22. Circular transverse perforated plate members 38 and 40 are positioned outboard of the retaining rings 34 and 36. Interiorly threaded insert members 24 and 26 are mounted inside end portions of the body 22 by means of adhesive or the like. End portions of the line sections 12A and 12B are mounted on nipples 42 and 44, respectively. The nipples 42 and 44 are threaded in the insert members 24 and 26, respectively. Flanged rings 46 and 48 hold the end portions of the line sections 12A and 12B in place on corrugated sections of the nipples.

Compressed air from the tank 16 (FIG. 1) is caused to flow through the plug 28 when the valve 18 is opened, and any droplets of water entrained in the air stream are absorbed in the material of the plug 28. As the air continues to pass through the plug, the absorbed water can be evaporated from the surface of the gauze into the air stream and is discharged as vapor. The plug can be observed through the transparent wall of the tubular body 22, and, if there should be a buildup of water on the plug, the device 10 can be replaced. The perforated plates 38 and 40 and the retaining rings 34 and 36 limit movement of the plug 28 lengthwise in the tubular body 22.

The tubular body 22 is not substantially greater in outside diameter than the line sections 12A and 12B so that the device 10 does not interfere with handling of the pneumatic line 12.

The pneumatic line section 12B preferably is restricted to a length of less than eight feet to prevent recondensing of the vaporized water between the device 10 and the paint spray gun 20 or other pneumatic device being used.

The plug 28, in addition to providing a means for absorbing and evaporating water droplets, acts as a filter to remove particles of dirt, paint, and other foreign materials entrained in the air stream.

The device has been described with particular reference to the removal of entrained water from a stream of compressed air, but it can be used in connection with other gas streams such as a stream of vaporized liquified petroleum or propane, or a stream of other gas such as nitrogen, hydrogen, or argon or the like which can carry entrained liquid droplets.

The device which has been described above and illustrated in the drawings is subject to modification without departing from the spirit and scope of the appended claims.

Having described my invention, what I claim as new and desire to secure by letters patent is:

1. In combination with a compressed air line, a tubular container in series with the compressed air line and a plug of porous water absorbent material in the tubular container, the plug absorbing droplets of water in a stream of compressed air passing through the tubular container and providing a surface from which the water evaporates into the compressed air stream as the compressed air passes through the plug, the tubular container including a cylindrical body, the plug being in a central portion of the body, retaining ring members mounted in the body at opposite ends of the plug, perforated transverse members extending transversely of the body outboard of the retaining ring members, internally threaded insert members mounted in the body outboard of the perforated transverse members, the insert members preventing outward movement of the perforated transverse members to limit movement of the plug lengthwise of the body, and means for connecting end portions of sections of the compressed air line to the insert members.

2. A combination as in claim 1 wherein the tubular container is transparent to reveal the outer surface of the plug.

3. A combination as in claim 1 wherein the plug comprises a strip of woven cotton gauze fabric material spirally wound on a strip of spirally wound wire screening, the wire screening keeping the plug dimensionally stable.

4. A combination as in claim 1 wherein there are transverse wire screening members in the tubular container at opposite ends of the plug to limit lengthwise movement of the plug.

5. A combination as in claim 1 which includes a device connected to the compressed air line and receiving compressed air from the compressed air line and the compressed air line includes a line section connecting the tubular container to the device which is of insufficient length to permit recondensing of water which has been evaporated in the tubular container.

* * * * *